July 14, 1942. C. H. RIPPL 2,289,385
CONTROL FOR PNEUMATICALLY OPERATED APPARATUS
Original Filed Jan. 13, 1937
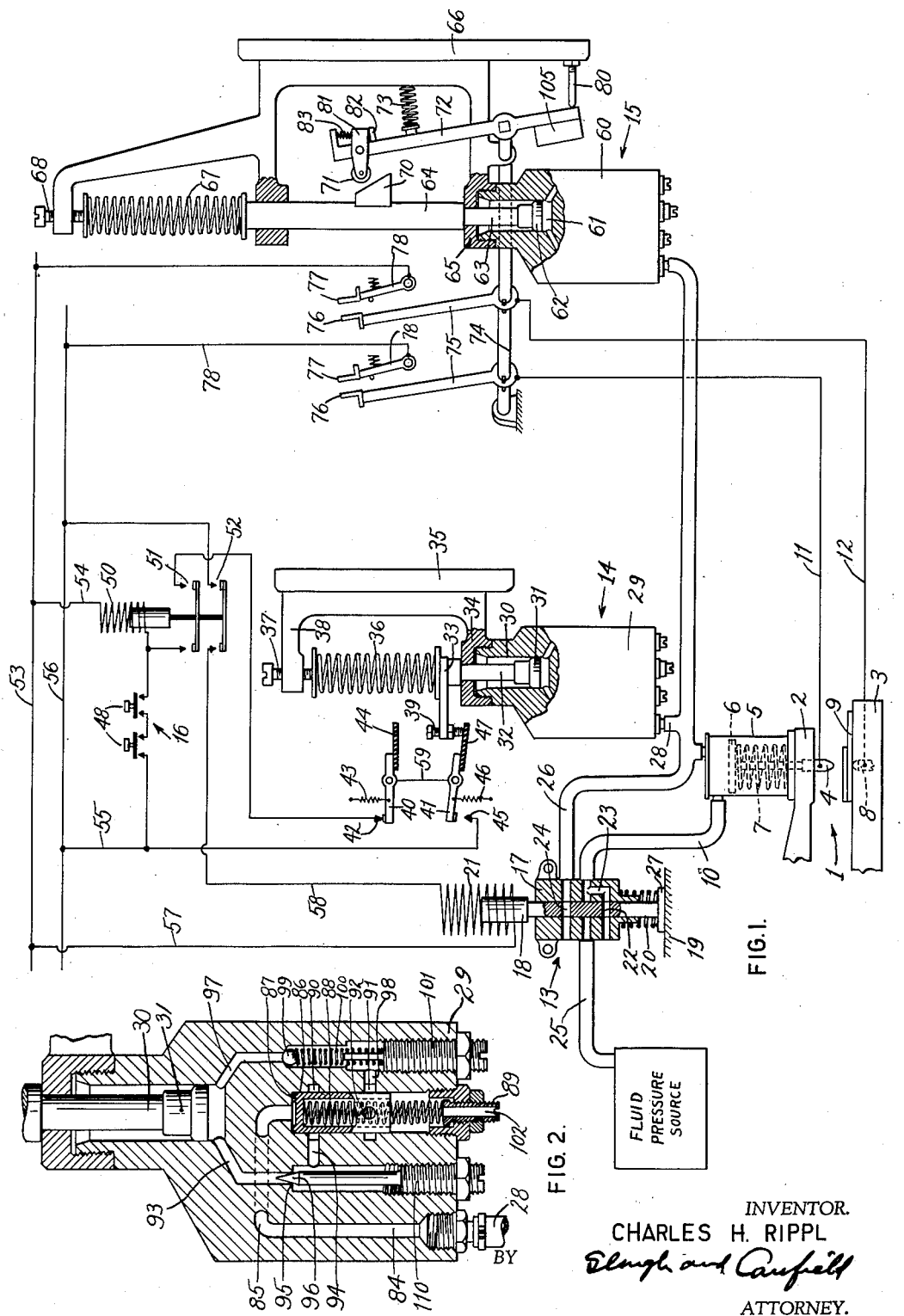
INVENTOR.
CHARLES H. RIPPL
BY
ATTORNEY.

Patented July 14, 1942

2,289,385

UNITED STATES PATENT OFFICE 2,289,385

CONTROL FOR PNEUMATICALLY OPERATED APPARATUS

Charles H. Rippl, Cleveland, Ohio, assignor to The Clark Controller Company, Cleveland, Ohio, a corporation of Ohio Application January 13, 1937, Serial No. 120,261
Renewed April 12, 1940

14 Claims. (Cl. 303—6)

This invention relates to controls for controlling and timing the operation of fluid pressure operated machines, such for example, as pneumatically operated presses, welding machines and the like; and relates to apparatus for stopping or preventing the operation of such machines under conditions hazardous to the operators thereof.

Machines of the above identified class comprise, in general, relatively reciprocatory platens or heads or electrodes between which work pieces, such for example as sheet metal pieces, are placed to be welded, press formed, etc. It is desirable for numerous reasons to interrupt the machine actuating pressure at the instant that a certain predetermined working pressure on the work piece or on the dies, electrodes or the like effecting the working operation on the piece, has been attained; or after the working pressure has been applied for a predetermined length of time.

In the case of machines of this class in which the work pieces are placed in the machine and removed therefrom manually by operators stationed near the machine, it is in some cases desirable to insure that at the time of operation of the machine the operator's hands and other parts of his body are removed sufficiently far from the working parts of the machine to avoid injury thereby.

While my invention is applicable to machines of the class referred to when operated hydraulically, it is particularly applicable to machines operated pneumatically and will be illustrated and described herein as applied to that use.

It is among the objects of the invention;
To provide an improved timing control for fluid pressure operated machines;
To provide an improved means for admitting pressure to a fluid pressure operated machine and for cutting off the pressure at a predetermined time;
To provide an improved means for preventing initiation of the operation of a fluid pressure operated machine of the class referred to or for stopping its operation if initiated, if and when operators of the machine are exposed to danger of injury by operation of the machine;
To provide an improved electro-pneumatic timing apparatus;
To provide an improved control for fluid pressure operated welding machines which will insure full engagement of the electrodes before the welding current is established, and until after the current is interrupted, and by which the time duration of the electrode engagement and the time duration of the current may be controlled.

Other objects will be apparent to those skilled in the art to which my invention appertains.

My invention is fully disclosed in the following description taken in connection with the accompanying drawing in which:

Fig. 1 is a diagrammatic view illustrating the embodiment of my invention in a control for a pneumatic spot welding machine; and Fig. 2 is a view illustrating in sectional form, and to larger scale a pneumatic pressure control mechanism illustrated in elevation in Fig. 1.

Referring to the drawing, I have shown generally at 1 a pneumatically operated spot welding machine. Such machines are well known in this art and it is deemed unnecessary to completely illustrate and describe such a machine herein. The machine 1 illustrated diagrammatically in the drawing comprises an upper head 2, a lower head 3, an upper electrode 4 reciprocable in the head 2 by a pneumatic device which may comprise a cylinder 5 and a piston 6 therewithin connected to the electrode 4 to reciprocate it, and a spring 7 to return the piston. A lower electrode 8 is associated with a lower head 3. Work pieces 9 to be welded may be placed on the head 3 and engaged with the electrode 8 and upon the application of compressed air to the cylinder 5 through the conduit 10, an upper electrode 4 will be projected downwardly and will clamp the work pieces 9 between the two electrodes 4 and 8 under pressure and then electric current flowing through wires 11 and 12 connected respectively to the electrodes 4 and 8 will produce the weld whereupon the pneumatic pressure may be released and the electrode 4 returned.

The control system to be described comprises among other elements, an electro-magnetic valve shown generally at 13 which controls the air to the cylinder 5; a pressure timing apparatus shown generally at 14; an electric welding current timing apparatus shown generally at 15 and a push button control apparatus shown generally at 16.

As will presently be more fully described, upon manual actuation of the push button control 16, the electro-magnetic valve 13 will be operated to admit air under pressure to the welding machine 1 and to the pressure timing apparatus 14 and current timing apparatus 15. If the push button control 16 is prematurely released, the machine 1 will not operate but if it is maintained actuated for a predetermined length of time determined by the pressure timing apparatus 14, then the control of the machine 1 will be taken over by the timing apparatus 14 and after the machine 1 has completed its operation, it will be restored by the apparatus 14, the latter apparatus maintaining pressure at the machine 1 until the weld has been completed. The current timing apparatus 15 will close the electric circuit to the machine 1 being timed to close it only after the electrodes 4 and 8 have been engaged with full pressure and timing the duration of the welding current impulse, and the timing apparatus 14 maintaining pressure at the machine 1 by its own timing means until after the current has been broken by the current timing apparatus 15. At the end of the complete cycle of operations, the timing apparatus 14 restores the electromagnetic valve 13 which, in turn, restores the machine 1, the current timing apparatus 15 and the pressure timing apparatus 14 itself.

Thus the pressure closing of the electrodes 4 and 8 always occurs automatically before the welding current circuit is closed and is always relieved only after the welding current is opened and pressure at the electrodes 4—8 will be interrupted and the electrodes 4 will not move down into pressure engagement with the work unless the push button control 16 is manually maintained, to protect the operators of the machine 1. These parts referred to in general above will now be fully described.

The electro-magnetic valve shown generally and diagrammatically at 13 comprises a cylinder 17 in which reciprocates a valve stem and plunger 18, normally held downwardly against a stop 19 by a spring 20 and arranged to be pulled inwardly by an electro-magnetic winding 21 when energized. In its normal position illustrated, the valve stem is stopped upwardly by engagement of a flange 27 on the lower end of the stem with the lower end of the cylinder 17 as shown. The stem has a valve port 22 normally connecting the conduit 10 to atmosphere by way of a duct 23 to exhaust pressure from the cylinder 5, and has a port 24 through which a conduit 26 to be referred to exhausts to atmosphere. When the stem 18 moves upwardly, it shuts off the port 24 and positions the port 22 to connect the conduit 10 with a conduit 25 which is connected to a source of fluid pressure such as a tank of compressed air.

The conduit 26 is connected to the cylinder 5 and receives compressed air therefrom supplied thereto by the conduit 10 and therefore the air in the conduit 26 is at first at a reduced pressure which builds up as the pressure in the cylinder 5 builds up and moves the piston 6. The pressure in the conduit 26 thus does not reach its final pressure until after the piston 6 has moved downwardly.

The compressed air or other fluid in the conduit 26 goes by a branch conduit 28 into a valve housing 29 comprising in the upper portion thereof, a cylinder 30 in which reciprocates a piston 31 connected to a piston rod 32 on the upper end of which is a head 33 normally resting on a support 34 which may be secured to a panel or the like 35.

A spring 36 normally holds the head 33 downwardly on the support 34 and reacts at its upper end on an adjusting screw 37 mounted in a bracket 38 on the panel 35. The head 33 is provided with an adjusting screw 39.

An upper and a lower switch arm 40 and 41 are pivotally supported at intermediate portions thereof, the upper switch arm 40 being normally engaged with the underside of a contact 42 by a spring 43 and having a tail piece 44 above the screw 39.

The lower switch arm 41 is constrained to be moved into engagement with a contact 45 by a spring 46 but is normally held out of engagement therewith by the lower end of the screw 39 engaging a tail piece 47 of the arm.

A plurality of push buttons 48—48 are provided. At 50 is the winding for operating a pair of normally open switches 51 and 52.

In the operation of the apparatus thus for described, after the work 9 has been placed in the machine 1, the operator closes both push buttons 48—48, the push buttons being disposed so that it is necessary for him to use both hands thereon and so that then his hands and all other parts of his body will be sufficiently far removed from the machine 1 that there is no possibility that he can be injured by the operation thereof. If the machine 1 is a machine requiring a number of operators, then the number of push buttons 48—48 will be correspondingly increased to insure protection of all of the operators.

The push buttons 48—48 are all connected in series relation and when they are all closed, current flows from a supply main 53 by a wire 54 through the winding 50 and the push buttons 48—48 and by a wire 55 to the other supply main 56.

The switch 52 is thereby closed and current is supplied by the mains 53 and 56 and wires 57 and 58 to the winding 21 which operates the valve 13 supplying pressure from the source to the machine cylinder 5 and also to the apparatus 14. The piston 31 of this apparatus moves upwardly at a retarded rate under the control of elements in the valve housing 29, to be more fully described, and likewise the electrode 4 moves downwardly. If the operators or any one of them should remove a hand from one of the push buttons 48—48, the circuit above described would be broken and the valve 13 would reset and the parts would go back to normal. But if the buttons are maintained closed until danger from the moving electrode 4 is past, the piston 31 will have moved upwardly sufficiently far to remove the screw 39 from the tailpiece 47 and the switch arm 41 will be moved to engage the contact 45 by the spring 46. Thereupon the current which was flowing through the push buttons 48—48 has now a parallel path around them by way of the wire 55, contact 45, switch arm 41, a connecting wire 59, switch arm 40, contact 42 directly to the switch 51 and thence through the winding 50 and wire 54. The switch 51 having been closed by the winding 50, the valve 13 will be maintained in its operated position. While the piston 31 is continuing its upward movement, the current timing apparatus 15 will close the electric circuit to the wires 11—12 in a manner to be described and after the current has again been broken, the piston 31 will have reached an upper position at which the screw 39 will engage the tailpiece 44 and rock the switch arm 40 to break the connection between the contact 42 and the switch arm, which as will now be understood will de-energize the winding 50 and open the switch 52 to reset the valve 13 to restore the parts.

When as above stated, air pressure was admitted to the conduit 26, it flowed through a valve housing 60 into a cylinder 61 in which reciprocates a piston 62 connected to a piston rod 63 connected at its upper end to a plunger 64 guided in a bracket 65 mounted on a panel 66. A spring 67 reacting at its lower end on the upper end of the plunger and at its upper end upon an adjusting screw 68 opposes movement of the plunger. A cam 70 on the plunger in the upward movement thereof engages a roller 71 on the upper end of an arm 72 and rocks the arm 72 clockwise against the tension of a spring 73.

The movement of the arm 72 is communicated to a shaft 74 upon which are mounted switch arms 75—75 carrying contacts 76—76 on their outer ends which are moved into engagement with contacts 77—77 on yieldable arms 78—78.

Upon the engagement of said contacts, current flows from the main 56 by a wire 78 through one pair of contacts and through one switch arm 75 to the wire 11 and passing through the engaged electrodes 4 and 8 passes back by the wire 12 through the other arm 75 and contacts 76—77 to the other main 53.

Continued movement upwardly of the plunger 64 causes the cam 70 to pass beyond the roller 71 whereupon the spring 73 will rock the shaft 74 in the direction to open the contacts 76—77 to break the welding current, the switch arm 72 being stopped upon a stop 80 in the switch open position.

The switch contacts 76—77 are thus closed and held closed for a short time interval to time the welding current. When, as above described, the pressure is cut off from the conduit 26, the plunger 64 returns downwardly and the cam 70 rocks the cam roller 71 out of its path, the roller being mounted on a pivoted arm 81 for this purpose, the arm normally being engaged with a stop 82 by a spring 83.

The valve housing 29 and the parts therein are shown in Fig. 2. The conduit 28 communicates with a duct 84 which communicates at the duct end portion 85 with a cylinder 86 in which reciprocates a piston valve 87 of tubular form closed at its upper end. A spring 88 in the valve abutting at its upper end upon the closed end of the valve and at its lower end upon a hollow stud 89 normally holds the valve upwardly to seal the end of the duct 85, the spring tension being adjustable by the threaded stud 89.

An upper and a lower annular chamber 90 and 91 open into the cylinder 86 and are normally closed off by the valve 87, the valve having a port 92 through the wall thereof normally communicating with the annular chamber 91.

A duct 93 communicates with the cylinder 30, above described, and communicates at its lower portion through a duct 94 with the annular chamber 90, the duct having a valve seat 95 and a needle valve 96 controlling the opening through the seat 95, the needle valve 96 being adjustable by a threaded lower end portion 110 threaded into the housing 29.

The cylinder 30 has an exhaust outlet duct 97 which communicates with the annular chamber 91 by a duct 98, the duct 97 being normally closed by a ball check valve 99 held in closing position by a spring 100 on a spring adjusting screw 101.

In operation of the parts in the valve housing 29, above described, when compressed air is admitted by the conduit 28, it flows through the duct 84 and duct portion 85 to the top of the cylinder 86. The valve 87 is retained in its upper duct closing position until the pressure has risen to a predetermined operating value whereupon the pressure moves the valve 87 downwardly and opens the annular chamber 90 whereby the air under pressure is admitted through the valve seat 95 to the duct 93 and to the piston cylinder 30 and the piston 31 moves upwardly as above described, the rate of movement being determined by the adjustment of the needle valve 96 to suitably retard the movement of the piston 31.

When, as above described, pressure is cut off from the conduit 28, the piston 31 is returned downwardly by the spring 36, and the valve 87 is moved upwardly by the spring 88 to open the port 92.

Thereupon the air from the cylinder 30 discharges through the duct 97 and the duct 98 and annular chamber 91 through the port 92 to the inside of the valve 87 and thence downwardly through the tubular stud 89 which has a duct 102 therethrough for the purpose.

By this means the discharge from the cylinder 30 is instantaneous and the admission of air thereto is timed as desired.

When the admission of air to the cylinder 30 by adjustment of the needle valve 96 is very slow, there may be sufficient leakage out through the duct 97 and around the valve 87 to relieve the pressure and to prevent such leakage, the check valve 99 is provided.

When the pressure is cut off from the conduit 26, as above described, by downward movement of the stem 18 of the electro-magnetic valve 13 and the movement of valve 87 upwardly to open the exhaust passageway through the port 92, the pressure above the valve is also relieved backwardly through the conduit 26 by the exhaust port 24 in the electro-magnetic valve 13. Also when the valve stem 18 moves downwardly to cut off application of pressure to the machine cylinder 5, it opens the exhaust port for the cylinder through the conduit 10 and valve port 22.

The parts in the valve housing 60 may be identical with those described above for the valve housing 29, although they may be adjusted differently, since the apparatus 15 is timed to a very short current impulse interval and the device 14 being timed for a longer interval.

The control arrangement in the housing 29 or the housing 60 and shown in Fig. 2 in detail, constitutes part of the subject matter of my Patent No. 2,172,261, dated Sept. 5, 1939, and the electric current timing apparatus 15 as a whole is also a part of the subject matter of that patent.

It will be observed that the timing apparatus 14 times an interval during which the push buttons 48—48 must be held closed and also times the total interval during which air is supplied to the machine 1 and that the timing is effected solely by the rate at which air is admitted to the cylinder 31. The current timing apparatus 15, however, times the duration of the electric current by the rate of admission of air to the cylinder 61 and also by the cam 70, together with the inertia of the arm 72 (which may be varied by a weight 105 or as described in the above recited patent).

In exhausting, the air in both of the cylinders 30 and 61 is forced out by the downward pressing springs 36 and 67 respectively.

The current timing apparatus 15 in every instance operates after operation of the machine 1 because the pressure in the conduit 26 necessary for its operation is not attained until after the machine 1 has operated. The same is true of the timing apparatus 14; and thus the correct sequence of functions is made certain.

Preferably the push button switches 48—48 will be mounted directly on or adjacent to the machine 1.

My invention is not limited to the exact details of construction illustrated and described. Changes and modifications may be made within the spirit of my invention without sacrificing its advantages and within the scope of the appended claims.

I claim:

1. In an electro-pneumatic apparatus, a fluid pressure operated machine and a fluid pressure operated device and a fluid pressure operated delayed operation timer, a source of fluid pressure, conduit means for effecting communication of fluid pressure from the source to the machine, the device and the timer to effect operation thereof, a source of electric current, an electro-magnetic valve controlling said conduit means, a valve actuating electric circuit from the current source to the valve, a control contactor controlling the valve actuating circuit, means controlled by the device for effecting an operation of the machine, upon communication of fluid pressure to the device by operation of the valve effected by an operation of the control contactor, auxiliary switch means operated by the timer, a holding circuit connected to the current source controlled by the auxiliary switch means to maintain the valve actuated independently of the control contactor after a predetermined time interval following initiation of operation of the timer, and auxiliary switch means operated by the timer after a second time interval to effect opening of the holding circuit and therefore the valve actuating circuit to thereby effect restoring of the valve and thereby restoring of the machine device and timer.

2. In an electro-pneumatic apparatus, a fluid pressure operated machine and a fluid pressure operated device and a fluid pressure operated delayed operation timer, a source of fluid pressure, conduit means for effecting communication of fluid pressure from the source to the machine, the device and the timer to effect operation thereof, a source of electric current, an electro-magnetic valve controlling said conduit means, a valve actuating electric circuit from the current source to the valve, a control contactor controlling the valve actuating circuit, means controlled by the device for effecting an operation of the machine, upon communication of fluid pressure to the device by operation of the valve effected by an operation of the control contactor, auxiliary switch means operated by the timer, a holding circuit connected to the current source controlled by the auxiliary switch means to maintain the valve actuated independently of the control contactor after a said operation of the machine and for a predetermined time interval following initiation of operation of the timer, and auxiliary switch means operated by the timer after a second time interval to effect opening of the holding circuit and therefore the valve actuating circuit to thereby effect restoring of the valve and thereby restoring of the machine, device and timer.

3. The system described in claim 2 and in which the machine comprises an expansible chamber to which the fluid pressure is communicated from the fluid pressure source, and the timer and device are supplied with fluid pressure from the chamber, whereby the fluid pressure supplied to the timer and device is a rising pressure attaining a value at which it operates the timer and device after operating the machine.

4. The system described in claim 1 and in which when the valve restores the machine, device and timer, it exhausts the fluid pressure therefrom.

5. In an electro-pneumatic apparatus, a fluid pressure operated machine and a fluid pressure operated device and a fluid pressure operated delayed operation timer, a source of fluid pressure, conduit means for effecting communication of fluid pressure from the source to the machine, the device and timer, to effect operation thereof, a source of electric current, an electro-magnetic valve controlling said conduit means, an electro-magnetic switch comprising switch contacts, an actuating electric circuit from the source to the switch, a control contactor controlling the switch actuating circuit, a valve actuating electric circuit and a switch holding circuit from the source to the valve and switch controlled by the contacts on the switch, means controlled by the device for effecting an operation of the machine upon communication of fluid pressure to the device by operation of the valve effected by an operation of the electric switch by the control contactor, auxiliary switch means operated by the timer, the holding circuit being controlled by the auxiliary switch means to maintain the electric switch and therefore the valve actuated independently of the control contactor for a predetermined time interval following initiation of operation of the timer, and auxiliary switch means operated by the timer after a second time interval to effect opening of the holding circuit and therefore the valve actuating circuit to thereby effect restoring of the valve and thereby restoring of the machine, device and timer.

6. In an electro-pneumatic apparatus, a fluid pressure operated machine and a fluid pressure operated device and a fluid pressure operated delayed operation timer, a source of fluid pressure, conduit means for effecting communication of fluid pressure from the source to the machine, the device and timer, to effect operation thereof, a source of electric current, an electro-magnetic valve controlling said conduit means, an electro-magnetic switch comprising switch contacts, an actuating electric circuit from the source to the switch, a control contactor controlling the switch actuating circuit, a valve actuating electric circuit and a switch holding circuit from the source to the valve and switch controlled by the contacts on the switch, means controlled by the device for effecting an operation of the machine, upon communication of fluid pressure to the contactor by operation of the valve effected by an operation of the control contactor, auxiliary switch means operated by the timer, a holding circuit connected to the current source controlled by the auxiliary switch means to maintain the valve actuated independently of the control contactor after termination of a said operation of the machine and for a predetermined time interval following initiation of operation of the timer, and auxiliary switch means operated by the timer after a second time interval to effect opening of the holding circuit and therefore the valve actuating circuit to thereby effect restoring of the valve and thereby restoring of the machine, device and timer.

7. The system described in claim 6 and in which the machine comprises an expansible chamber to which the fluid pressure is communicated from the fluid pressure source, and the timer and device are supplied with fluid pressure from the chamber, whereby the fluid pressure supplied to the timer and device is a rising pressure attaining a value at which it operates the timer and device after operating the machine.

8. In an electro-pneumatic apparatus, a fluid pressure operated machine, a fluid pressure operated delayed operation timer, a source of fluid pressure, conduit means for effecting communication of fluid pressure from the source to the machine and the timer to effect operation thereof, a source of electric current, an electro-magnetic valve controlling said conduit means, a valve actuating electric circuit from the current source to the valve, a control contactor controlling the valve actuating circuit, auxiliary switch means operated by the timer, a holding circuit connected to the current source, controlled by the auxiliary switch means to maintain the valve actuated independently of the control contactor after a predetermined time interval following initiation of operation of the timer, and auxiliary switch means operated by the timer after a second time interval to effect opening of the holding circuit and therefore the valve actuating circuit to thereby effect restoring of the valve and thereby restoring of the machine and timer.

9. In an apparatus comprising a machine having a fluid pressure movable element, a source of fluid pressure, a fluid pressure operable timer, a source of electric current, electrically actuatable means for effecting admission of fluid pressure to the machine to effect movement of the movable element and to the timer to initiate a timer interval, electric circuit means and operator's contactor means for effecting actuation of the actuatable means from the current source, the timer being provided with contactor means operable after a first part of its time interval to maintain actuation of the electrically actuatable means independently of the operator's contactor means, and for effecting restoring of the electrically actuatable means at the end of a second part of the time interval to effect interruption of the said fluid pressure communication to thereby effect restoring of the machine element and timer.

10. In an apparatus comprising a power operated machine, a source of fluid pressure, a fluid pressure operated timer, a source of electric current, electrically actuatable means for effecting an operation of the machine and admission of fluid pressure from the source to the timer to initiate a timer interval, electric circuit means and operator's contactor means for effecting actuation of the actuatable means from the current source, the timer being provided with contactor means operable after a first part of the time interval to maintain actuation of the electrically actuatable means independently of the operator's contactor means, and for effecting restoring of the electrically actuatable means at the end of a second part of the timer interval to effect restoring of the machine and interruption of the fluid pressure communication to thereby effect restoring of the timer.

11. In an apparatus comprising a fluid pressure operated machine, a source of fluid pressure; a fluid pressure operated timer; a source of electric current; electrically actuatable means for effecting supply of fluid pressure from the source to the machine to effect an operation thereof and to the timer to initiate a timer interval; electric circuit means and operator's contactor means for effecting actuation of the actuatable means from the current source; the timer being provided with contactor means operable after a first part of the time interval of the timer to maintain actuation of the electrically actuatable means independently of the operator's contactor means and for effecting restoring of the electrically actuatable means at the end of the second part of the timer interval, to effect restoring of the machine and interruption of the supply of fluid pressure, to thereby effect restoring of the timer.

12. In an apparatus comprising a fluid-pressure-operated machine, a source of fluid pressure, a fluid-pressure-operated timer, a fluid-pressure-operated device which when operated controls an operation of the machine, a source of electric current, electrically actuatable means for effecting supply of fluid pressure to the machine and to the device, and to the timer to initiate a timer interval, electric circuit means and operator's contactor means for effecting actuation of the actuatable means from the current source, the timer being provided with contactor means operable after a first part of the time interval of the timer to maintain actuation of the electrically actuatable means independently of the operator's contactor means and for effecting restoring of the electrically actuable means at the end of the second part of the time interval and after operation of the fluid-pressure-operated device, to effect interruption of the supply of fluid pressure by the electrically actuatable means.

13. In an apparatus comprising a fluid-pressure-operated machine, a source of fluid pressure, a fluid-pressure-operated timer, a fluid-pressure-operated device which when operated controls an operation of the machine, a source of electric current, electrically actuatable means for effecting supply of fluid pressure to the machine and to the device, and to the timer to initiate a timer interval, electric circuit means and operator's contactor means for effecting actuation of the actuatable means from the current source, an electric circuit to maintain actuation of the electrically actuatable means independently of the operator's contactor means, the timer being provided with contactor means operable after a timer time interval and after operation of the device to effect interruption of the fluid pressure supply by the electrically actuatable means.

14. In an apparatus comprising a fluid-pressure-operated machine, a source of fluid pressure, a fluid-pressure-operated timer, a source of electric current, electrically actuatable means for effecting supply of fluid pressure to the machine to operate it, and to the timer to initiate a timer interval, electric circuit means and operator's contactor means for effecting actuation of the actuatable means from the current source, an electric circuit to maintain actuation of the electrically actuatable means independently of the operator's contactor means, the timer being provided with contactor means operable after a timer time interval to effect interruption of the fluid pressure supply by the electrically actuatable means, to effect restoring of the machine and of the timer.

CHARLES H. RIPPL.